United States Patent [19]

Weinhold

[11] Patent Number: 4,463,972

[45] Date of Patent: Aug. 7, 1984

[54] PIPE COUPLING MEANS FOR CONNECTING TWO PIPE ENDS TO EACH OTHER

[76] Inventor: Karl Weinhold, Im Jagdfeld 43, 4040 Neuss, Fed. Rep. of Germany

[21] Appl. No.: 328,690

[22] Filed: Dec. 8, 1981

[30] Foreign Application Priority Data

Dec. 17, 1980 [DE] Fed. Rep. of Germany ....... 3047457

[51] Int. Cl.³ ............................................. F16L 55/00
[52] U.S. Cl. ...................................... 285/175; 285/38; 285/331; 285/364
[58] Field of Search ............... 285/175, 174, 243, 252, 285/331, 281, 364, 38

[56] References Cited

U.S. PATENT DOCUMENTS

| | | | |
|---|---|---|---|
| 3,396,993 | 8/1968 | Weinhold | 285/243 X |
| 3,473,832 | 10/1969 | Kreidel et al. | 285/281 X |
| 4,152,016 | 5/1979 | Weinhold | 285/174 |
| 4,269,436 | 5/1981 | Medney | 285/331 X |

FOREIGN PATENT DOCUMENTS 970796  7/1975 Canada .............................. 285/174
1911969 10/1970 Fed. Rep. of Germany ...... 285/174

Primary Examiner—Dave W. Arola
Attorney, Agent, or Firm—Sherman & Shalloway

[57] ABSTRACT

A pipe coupling for coupling pipe ends to each other, one pipe end having at its end an annular shoulder limiting the sliding of a first sleeve member over the pipe end. The second sleeve member is so dimensioned that it fits over a piping end and is welded to same. The two sleeve members are insertable into each other such that a clamping shell comprised of two half-shells hinged to each other engages exterior shoulders of the sleeve members at a location wherein the two sleeve members are overlapped one by the other. Preferably, the second sleeve member is integral with a flange for connecting the member to an existing sleeve on the respective piping end. The invention results in a short overall structure facilitating the use of the coupling with flanged pipe connections of a piping system.

10 Claims, 2 Drawing Figures

PIPE COUPLING MEANS FOR CONNECTING TWO PIPE ENDS TO EACH OTHER

BACKGROUND OF THE INVENTION

The invention relates to pipe couplings for connecting two pipe ends of which one has an annular protrusion, provided with an annular seal directed radially outwardly. The coupling includes a sliding sleeve, overlapping the annular protrusion and is movable in axial direction relative to the said pipe end. The counterpart of the sliding sleeve end connectable with same is a sleeve section secured, e.g. by welding, to the other or second pipe end. The sliding sleeve and the sleeve section have each a radially outwardly protruding annular protrusion or shoulder engageable by a clamping shell usually comprised of two half-shells hinged to one another and held in closed state by a clamping lever mechanism.

It is known in the couplings of this type to provide the equivalent of the sleeve section such that it is in fact an insert which can be inserted into a first sleeve part forming functional counterpart of the said sliding sleeve. If the end of the piping to be attached to the sleeve section has a connecting flange at its end, then a complementary flange must also be welded to the outside of the insert. This results in relatively large overall length which often hinders or makes the use of such a pipe coupling impossible.

SUMMARY OF THE INVENTION

It is, therefore, an object of the present invention to provide a coupling device suitable for connecting pipe ends and having a shorter overall length and, if necessary, connectable to an existing flange of the piping.

In general terms, the present invention relates to a pipe coupling means for connectiing two pipe ends to each other, a first one of said pipe ends having an annular protrusion having an annular seal disposed in the radially extending surface of the protrusion, said coupling means being provided with a sliding sleeve adapted to overlap said annular protrusion and to be movable in axial direction relative to said first pipe end; with a sleeve section adapted to be fixedly secured to the second one of said pipe ends and to be releasably secured to said sliding sleeve, said sliding sleeve and said sleeve section having an annular clamping protrusion and a radially outwardly protruding flange, respectively, and outer shell means adapted to overlap the annular clamping protrusion and the radially outwardly protruding flange when the coupling means is closed, said outer shell means comprising two half-shells hinged to one another, and adpated to be closed by a clamp lever closure, an improvement wherein the sleeve section is adapted to surround a part of the sliding sleeve, said sleeve section having inside diameter of the size allowing the second pipe end, whose inside diameter generally corresponds to that of said first pipe end, to be inserted into said sleeve section, the annular clamping protrusion of said sleeve section is disposed on the exterior thereof, and the sliding sleeve has an outer annular seal interacting with the interior of said sleeve section.

As a result the overall length of the device is considerably shortened in the area of the insert. The outer shoulder of the insert can be arranged over the area in which the insert and the sliding sleeve overlap each other. If necessary, the sleeve section can be provided with a connecting flange which is also located at least partially over the actual area of overlapping, so that the part of the device forming the sleeve section requires only a very short additional overall length to extend over the end overlapped by the counterpart of the coupling.

The pipe end piece, insertable into the sleeve section, can be a part of an existing piping and need not even have especially machined seal engaging surface. The sleeve section need only be slid onto such pipe end piece and welded to it.

However, according to the invention, the sleeve section can also be provided with a connecting flange, whereby a pipe end piece can be inserted into the sleeve section to form, with the inner wall of the sleeve section, an annular space containing the sliding sleeve of the other pipe end. Thus, the pipe piece can be clamped in the sleeve part or be connected with the sleeve part by shrinking or welding. The sleeve section then has an essentially smooth outer end so that a piping end part provided with a connecting flange can be fastened to this end by bolts connecting the flanges. In each case, the pipe piece inserted or projecting into the sleeve part guarantees a constant inner flow cross-section.

It is further advantageous according to the invention if the inner diameter of the sliding sleeve expands slightly conically towards the front end of the sliding sleeve. In this manner, it is attained that the annular seal, provided at the annular protrusion of the pipe end attached to the sliding sleeve engages the sliding sleeve, and becomes flush with its inner wall only when the sliding sleeve is fully inserted into the sleeve part attached to the other pipe end. By means of the axial mobility of the sliding sleeve on the pipe end, it is, moreover, guaranteed that the connecting and disconnecting of the coupling can be effected without requiring axial displacement of the respective piping ends relative to each other.

If the sleeve section is provided with a connecting flange, the clamping half-shells can be secured to the connecting flange by means of a hinge bolt to prevent their loss on disconnecting the coupling.

DETAILED DESCRIPTION OF PREFERRED EMBODIMENT

Figure 1:
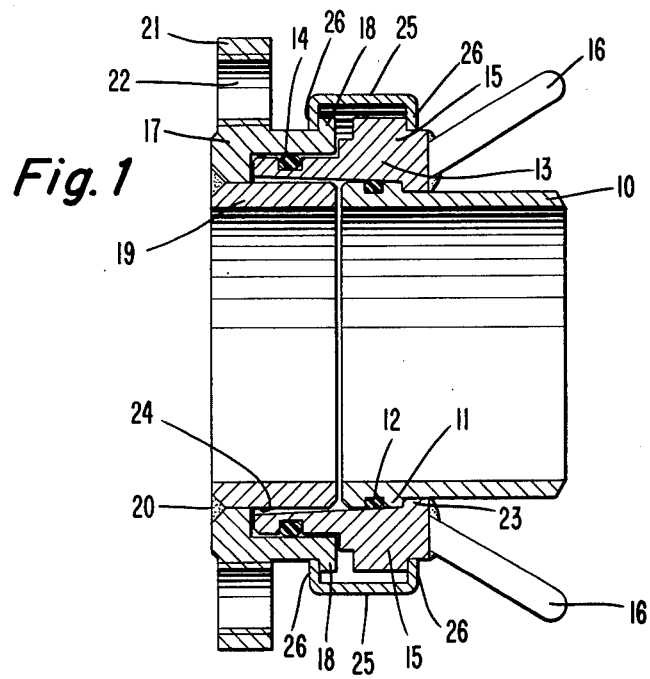
FIG. 1 is a longitudinal section of a preferred embodiment of the device.

A first pipe end 10 has an outer annular protrusion 11 into which an elastic annular seal 12 is inserted. On the pipe end 10, a sliding sleeve 13, which also has an annular seal 14 in its outer peripheral area, is arranged for movement in axial direction relative to the pipe end 10. In addition, the sliding sleeve 13 has an outer annular protrusion 15 and handles 16 which facilitate the shifting of the sliding sleeve 13.

The counterpart is formed as sleeve section 17 whose end facing the sliding sleeve 13 has an inner cross-section adapted for a sliding engagement over the adjacent section of the sliding sleeve 13. When the sleeve section 17 is pushed onto the sliding sleeve 13, the annular seal 14 engages the inner surface of the sleeve section 17. A radially outwardly protruding flange 18 of the sleeve section 17 is provided over the insertion area.

A pipe piece 19 is inserted into the sleeve section 17. The inner diameter of the pipe piece 19 is flush with that of the pipe end 10, whereas the outer diameter of the pipe piece 19 corresponds to the inner diameter of the sliding sleeve 13 at a sliding clearance between the two. The pipe piece 19 is secured to the sleeve section 17 by a welding seam 20. The sleeve section further comprises an annular connecting flange 21 which is provided with bores 22. Consequently, the end of a piping not illustrated in the drawings which is also provided with a complementary connecting flange can be connected with the flange 21 by bolts or the like, also becoming fixedly secured to the sleeve section 17.

It is, however, also conceivable that the pipe piece 19 may itself be an end section of an existing piping, to which the sleeve section 17 is welded at 20.

The sliding sleeve 13 has an inwardly projecting annular shoulder 23, which is adapted to abut axially against the annular protrusion 11 of the pipe end 10, so that the latter cannot be pulled out of the sliding sleeve 13. The inside diameter of part of the inner wall of the sliding sleeve 13, disposed forwardly of the shoulder 23 (to the left of FIG. 1) and designated with reference numeral 24, expands slightly conically towards the front of said sliding sleeve. When the sliding sleeve 13 of FIG. 1 is pushed onto the pipe end 10 towards the right in order to release the connection, the annular seal 12 is correspondingly released in radial direction, so that it is no longer in frictional engagement with the inner wall of the sliding sleeve 13 and an easier shifting is possible.

Figure 2:
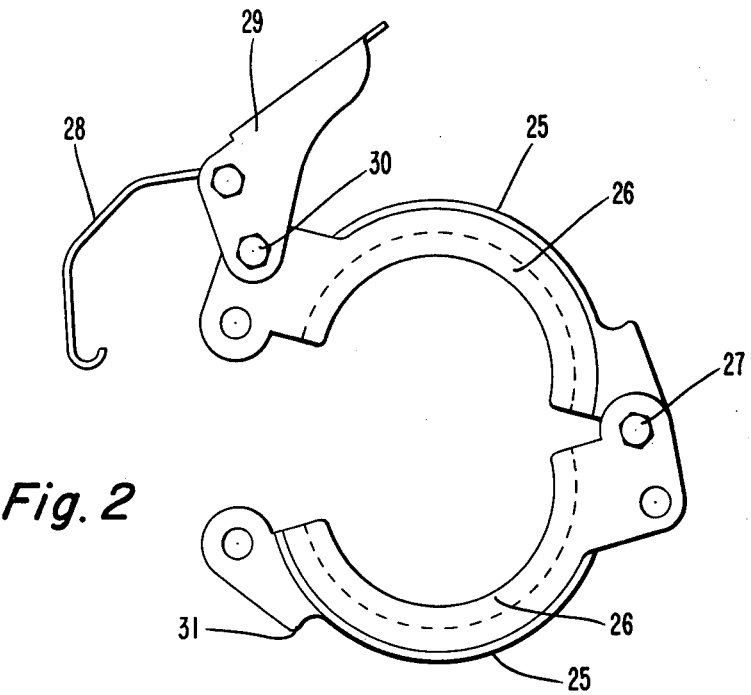
FIG. 2 is an end view of the clamping half-shells and of the clamp lever closure.

Two half-shells 25, each provided with an inwardly projecting flange 26 at each end thereof, serve to hold the sliding sleeve 13 and the sleeve section 17 together. The half-shells 25 are connected to each other by a hinge bolt 27 at one side. The other side of the half-shells 25 can be connected by a clamp lever closure, which consists of a spring 28 and a clamp lever 29 and is fastened to one of the half-shells 25 by a bolt 30. In order to close the coupling, the curved end of the spring 28 is hooked behind a protrusion 31, at the other half-shell 25. As shown in FIG. 1, the half-shells 25 overlap the sleeve section 17 and the sliding sleeve 13 in such a way that the respective flange 26 are disposed each axially outwardly of the annular protrusion 15 and the flange 18, respectively. The hinge bolt 27 or an additional hinge bolt passing through the lower opening below the bolt 27 in FIG. 2 (only the opening being shown in the drawing) can also be used for securing the outer shell means formed by the two half-shells to the flange 21.

Those skilled in the art will appreciate that further embodiments exist departing from the preferred embodiments described above, without departing from the present invention as defined in the accompanying claims.

I claim:

1. In a pipe coupling means for connecting two pipe ends to each other, a first one of said two pipe ends having an annular protrusion having an annular seal disposed in a radially extending surface of the protrusion, said coupling means being provided with a sliding sleeve with a radially inwardly extending shoulder thereof adapted to overlap said annular protrusion and said sliding sleeve being movable in an axial direction relative to said first one of said two pipe ends, said axial movement being limited in one direction by engagement of said annular protrusion with said radially inwardly extending shoulder; a sleeve section secured to a second one of said two pipe ends and being releasably secured to said sliding sleeve by outer shell means, said sliding sleeve and said sleeve section having an annular clamping protrusion and a radially outwardly protruding flange, respectively, and said outer shell means overlapping the annular clamping protrusion and the radially outwardly protruding flange when the outer shell means is closed to thereby retain said sliding sleeve and said sleeve section clamped together, said outer shell means comprising two halfshells hinged to one another and actuated to open and closed positions by a clamp lever closure, an improvement wherein the sleeve section surrounds in assembly a part of the sliding sleeve, said sleeve section having an inside diameter of a size allowing the second one of said two pipe ends, the inside diameter of which generally corresponds to that of said first one of said two pipe ends to be inserted into said sleeve section and secured thereto by securing means, the annular clamping protrusion of said sleeve section being disposed on the exterior thereof, and the sliding sleeve having an outer annular seal interacting with the interior of said sleeve section.

2. The invention as claimed in claim 1, wherein the sleeve section is provided with a connecting flange, said second one of said two pipe ends being inserted into the sleeve section and forming with the inner wall of the sleeve section an annular space containing the sliding sleeve of said first one of said two pipe ends.

3. The invention as claimed in claim 1 or 2, wherein the inner diameter of the sliding sleeve expands slightly conically in the direction from said first one of said two pipe ends to said second one of said two pipe ends.

4. The invention as claimed in claim 2, wherein said half-shells are secured to the connecting flange and to each other by means of a hinge bolt.

5. The invention as claimed in claim 1 or 2, wherein the inner diameter of the sliding sleeve expands slightly conically in the direction from said first one of said two pipe ends to said second one of said two pipe ends, said halfshells being secured to the connecting flange and to each other by a hinge bolt.

6. A pipe coupling for connecting a first pipe end to a second pipe end, said first and second pipe ends being generally of the same inner diameter, said first pipe end being provided with a radially outwardly projecting annular protrusion having an annular seal disposed in an exterior circumferential surface thereof, said coupling means comprising, in combination:
   (a) a sliding sleeve having a major inner diameter section extending from a first end of the sliding sleeve normally facing away from the respective first pipe end toward the respective second pipe end and adapted to overlap the annular protrusion of the respective first pipe end and to sealingly engage the respective annular seal, a minor inner diameter section at a second end of the sliding sleeve and a shoulder section between said inner diameter sections, said shoulder section being adapted to abut against the annular protrusion of the respective first pipe end to thus limit sliding axial displacement of the sliding sleeve relative to the respective first pipe end;
   (b) a second sleeve member secured to the respective second pipe end by securing means and releasably secured to said sliding sleeve;

(c) said sliding sleeve and said second sleeve member having each an annular clamping protrusion defining a radially outwardly directed flange face;

(d) outer shell means adapted to overlap the annular clamping protrusions and to engage said flange faces to hold the sliding sleeve and the second sleeve member in an engaged state and to thus prevent axial displacement of said first and second pipe ends away from each other, said outer shell means being comprised of two half-shells hinged to each other and including a releasable clamp lever closure;

(e) said sliding sleeve and said second sleeve member assuming in assembly an axially partially overlapping state relative to each other;

(f) said second sleeve member having a first inside diameter section of a size selected to allow sliding engagement and securement by said securing means between said second sleeve member and an outer surface of said second pipe end, said first inside diameter section being at a first end of the second sleeve member which normally faces away from the sliding sleeve;

(g) said second sleeve member further comprising, at a second end thereof, a second inside diameter section adapted to allow insertion of a tubular free end section of the sliding sleeve into the second inside diameter section; and (h) said free end section being provided at the exterior periphery thereof with a second annular seal for sealing engagement between the free end section and the second inside diameter section.

7. A pipe coupling as claimed in claim 6, wherein said second sleeve member is provided with a connecting flange at said first end thereof, and wherein said second pipe end protrudes into said second inside diameter section to define therewith an annular space for receiving said free end section of the sliding sleeve.

8. A coupling as claimed in claim 6, wherein said major inner diameter section conically increases in diameter in the direction away from said shoulder section.

9. A coupling as claimed in claim 7, wherein said half-shells are connected to each other and to the said connecting flange, by a hinge bolt.

10. A coupling as claimed in claim 7, wherein said half-shells are connected to each other and to the said connecting flange by a hinge bolt, and wherein said major inner diameter section conically increases in diameter in the direction away from said shoulder section.

* * * * *